US008439283B2

(12) United States Patent
Pfeffer et al.

(10) Patent No.: US 8,439,283 B2
(45) Date of Patent: May 14, 2013

(54) FLUIDIZED BED SYSTEMS AND METHODS INCLUDING MICRO-JET FLOW

(75) Inventors: Robert Pfeffer, Scottsdale, AZ (US); Jose A. Quevedo, Brick, NJ (US); Juergen Flesch, Rayong (TH)

(73) Assignees: New Jersey Institute of Technology, Newark, NJ (US); Orion Engineered Carbons GmbH, Hanau (DE)

( * ) Notice: Subject to any disclaimer, the term of this patent is extended or adjusted under 35 U.S.C. 154(b) by 0 days.

(21) Appl. No.: 13/361,485

(22) Filed: Jan. 30, 2012

(65) Prior Publication Data

US 2012/0192449 A1 Aug. 2, 2012

Related U.S. Application Data

(62) Division of application No. 11/937,736, filed on Nov. 9, 2007, now Pat. No. 8,118,243.

(60) Provisional application No. 60/858,072, filed on Nov. 10, 2006.

(51) Int. Cl.
*B02C 19/06* (2006.01)
*B02C 23/00* (2006.01)

(52) U.S. Cl.
USPC .................................. 241/5; 241/39

(58) Field of Classification Search .......... 241/5, 39
See application file for complete search history.

(56) References Cited

U.S. PATENT DOCUMENTS

| 3,219,281 A * | 11/1965 | Jasper et al. ............... 241/5 |
| 3,259,998 A | 7/1966 | Leclere et al. |
| 3,734,413 A | 5/1973 | Kaiser |
| 4,007,969 A | 2/1977 | Aubin et al. |
| 4,095,960 A | 6/1978 | Schuhmann, Jr. |
| 4,219,164 A * | 8/1980 | Taylor ........................... 241/5 |
| 4,261,521 A | 4/1981 | Ashbrook |
| 4,648,332 A | 3/1987 | Goedhart |

(Continued)

FOREIGN PATENT DOCUMENTS

| DE | 102004023372 | 12/2005 |
| EP | 0280016 | 8/1988 |

OTHER PUBLICATIONS

Hong, et al., Fluidization of Fine Powders in Fluidized Beds With an Upward or Downward Air Jet, China Particuology, vol. 3, No. 3, 2005, pp. 181-186.

(Continued)

*Primary Examiner* — Faye Francis
(74) *Attorney, Agent, or Firm* — McCarter & English, LLP

(57) ABSTRACT

Methods and systems for enhancing fluidization of nanoparticle and/or nanoagglomerates are provided. A fluidization chamber is provided with a fluidizing medium directed in a first fluidizing direction, e.g., upward into and through a bed containing a volume of nanoparticles and/or nanopowders. A second source of air/gas flow is provided with respect to the fluidization chamber, the secondary air/gas flow generally being oppositely directed relative to the fluidizing medium. Turbulence created by the secondary gas flow is advantageously effective to aerate the agglomerates and the shear generated by the jet is advantageously effective to break apart nanoagglomerates and/or reduce the tendency for nanoagglomerates to form or reform. A downwardly directed source of secondary gas flow located near the main gas distributor leads to full fluidization of the entire amount of powder in the column. The oppositely directed fluid flow facilitates powder circulation within the fluidization chamber, thereby enhancing fluidization results.

20 Claims, 17 Drawing Sheets

U.S. PATENT DOCUMENTS

| | | | | |
|---|---|---|---|---|
| 4,750,677 | A | * | 6/1988 | Taylor .................................. 241/5 |
| 4,905,918 | A | | 3/1990 | Selles et al. |
| 5,133,504 | A | | 7/1992 | Smith et al. |
| 5,271,450 | A | | 12/1993 | Bailey |
| 6,685,886 | B2 | | 2/2004 | Bisgrove et al. |
| 6,942,170 | B2 | | 9/2005 | Casalmir et al. |
| 6,951,312 | B2 | | 10/2005 | Casalmir et al. |
| 7,032,849 | B2 | * | 4/2006 | Takahashi et al. .............. 241/39 |
| 7,156,331 | B2 | * | 1/2007 | Takahashi et al. .............. 241/39 |
| 7,178,747 | B2 | | 2/2007 | Yadav et al. |
| 7,364,101 | B2 | * | 4/2008 | Tanaka et al. ................ 241/79.1 |
| 7,538,142 | B2 | | 5/2009 | Lortz et al. |
| 8,118,243 | B2 | | 2/2012 | Pfeffer et al. |
| 2005/0127214 | A1 | | 6/2005 | Martens et al. |
| 2006/0086834 | A1 | | 4/2006 | Pfeffer et al. |
| 2006/0124784 | A1 | | 6/2006 | Takahashi et al. |
| 2007/0029416 | A1 | | 2/2007 | Krebs et al. |
| 2007/0200015 | A1 | | 8/2007 | Sawada et al. |
| 2008/0048058 | A1 | * | 2/2008 | Ito et al. ............................ 241/5 |
| 2008/0054106 | A1 | | 3/2008 | Zehavi et al. |
| 2008/0111008 | A1 | | 5/2008 | Hulet |

OTHER PUBLICATIONS

Alfredson, et al., "A Study of Pulsed Fluidization of Fine Powders," Chemeca '70, 117, (1970).

Shen, et al., "Study of a Downward Grid Jet in a Large Two-dimensional Gas-fluidized Bed," Powder Technol., 62(3), 227-234 (1990).

Shen, et al., "Study of a Downward Gas Jet in a Two-dimensional Fluidized Bed," Can. Chem. Eng., 68(4), 534-540 (1990).

Werther, et al., "Jet Attrition of Catalyst Particles in Gas Fluidized Beds," Powder Technol., 76(1), 39-46 (1993).

Lu, Xuesong, Hongzhong, Li, "Fluidization of $CaCO_3$ and $FE2O3$ Particle Mixtures in a Traverse Rorating Magnetic Field", Powder Technology, vol. 107, pp. 66-78, 2000.

Zhu, Chao, Guangliang Liu, Qun Yu, Robert Pfeffer, Rajesh N. Dave, Caroline H. Nam, "Sound Assisted Fluidization of Nanoparticle Agglomerates," Powder Technology, 141, 119 (2004).

Hong, et al., "Fluidization of Fine Powders in Fluidized Beds with an Upward or Downward Air Jet," China Particuology, vol. 3, No. 3, pp. 181-186, 2005.

Hakim, et al., "Aggregation Behavior of Nanoparticles in Fluidized Beds," Powder Technology, vol. 160, pp. 149-160, (2005).

Yang, "Fluidization of Fine Cohesive Powders and Nanoparticles—A Review," Journal of the Chinese Institute of Chemical Engineers, vol. 36, pp. 1-16 (2005).

Blackburn, et al., "Instability Modes and Transition of Pulsatile Stenotic Flow: Pulse-Period Dependence", Under consideration for publication in J. Fluid Mech., pp. 1-31, received May 22, 2006.

http://users.monash.edu.au/~rhodes/projects.htm#2 on Aug. 22, 2006.

http://www.eng.monash.edu.au/chemeng/seminars/akhavan%20_25may-06.pdf#search=%22ali&20akhavan%2C%20pulsed%22 on Aug. 22, 2006 (not currently available; see discussion in Information Disclosure Statement dated Nov. 20, 2008 in parent Patent No. 8,118,243).

PCT International Search Report dated May 29, 2008.

* cited by examiner

△ Aerosil R974 (9.5 g - 2 cm/s - 1.3 lpm nozzle)
○ Aerosil R974 (13.3 g - 1.8 cm/s - 1.3 lpm nozzle)
□ Aerosil R974 (20 g - 1.6 cm/s - 1.3 lpm nozzle)

Upstream pressure of 120 psi

Upstream pressure of 20 psi.

FLUIDIZED BED SYSTEMS AND METHODS INCLUDING MICRO-JET FLOW

CROSS-REFERENCE TO RELATED APPLICATION

The present application claims the benefit of (i) a non-provisional patent application entitled "Fluidized Bed Systems and Methods Including Micro-Jet Flow, which was filed on Nov. 9, 2007 and assigned Ser. No. 11/937,736, now U.S. Pat. No. 8,118,243, and (ii) a provisional patent application entitled "Fluidization System Enhanced by Micro-Jet Flow," which was filed on Nov. 10, 2006 and assigned Ser. No. 60/858,072. The entire contents of the foregoing patent applications are incorporated herein by reference.

RELATED FEDERALLY SPONSORED RESEARCH

The work described in this patent disclosure was sponsored by the following Federal Agencies: National Science Foundation (NSF) Grant: NIRT DMI 0210400.

BACKGROUND

1. Technical Field

A method and system for fluidization of particles, particularly agglomerates of nanoparticles and/or nanopowders, are provided wherein a fluidizing medium (e.g., a fluidizing gas) is directed in a first direction and an opposite jet flow is introduced to the chamber. The opposite jet flow is effective in enhancing the fluidization behavior of the disclosed system, even if the opposite flow is reduced and/or discontinued at a point in time after desired fluidization parameters are achieved. In fluidization systems including agglomerates of nanoparticles, the jet flow need not necessarily be opposite to the flow of the fluidization medium to provide enhanced results, although if fluidization of all the powder contained in the chamber is desired, oppositely directed jet flow is required.

2. Background Art

Challenges are frequently encountered in fluidizing systems, particularly systems that include small particles. Indeed, the small size and large surface area of nanoparticles and nanopowders increase the cohesive forces, such as van der Waals forces, acting on and between individual nanoparticles and nanoagglomerates. Due to these interparticle forces, agglomerates of various sizes and shapes are frequently formed in fluidization chambers. The presence of such agglomerates significantly limits the efficacy of conventional fluidization techniques with respect to nanoparticle and/or nanopowder systems.

Based on the Geldart classification system, powders having particle sizes less than about 20-30 microns (hereinafter μm) are defined as Geldart Group C powders. Geldart Group C powders are also referred to as fine cohesive powders. Nanoparticles are generally defined as particles having dimensions on the scale of nanometers. In most instances, nanoparticles are defined as having dimensions less than about 100 nm. Interest in the area of nanoparticle fluidization has increased due to increasing and potential uses for nanoparticles.

Many methods of enhancing fluidization by disrupting forces between particles are discussed in the literature. Lu et al. separates these fluidization aids for Geldart Group C particles into external methods (i.e., methods that overcome forces between particles using an external force) and intrinsic methods (i.e., methods that decrease forces between particles by changing conditions proximate the particles). [Lu, Xuesong, Hongzhong Li, "Fluidization of $CaCO_3$"] Fluidization aids include flow conditioners, mechanical vibration, sound-assisted fluidization, fluidization with magnetic/electric fields, pulsed fluidization and centrifugal fluidization. [Yang, Wen-Ching. "Fluidization of Fine Cohesive Powders and Nanoparticles—A Review," Journal of the Chinese Institute of Chemical Engineers, 36(1), 1, (2005)] Flow conditioners may include additives, for example, an anti-static surfactant. [Hakim, L. F., J. L. Portman, M. D. Casper, A. W. Weimer, "Aggregation Behavior of Nanoparticles in Fluidized Beds," Powder Technology, 160, 153, (2005).]

U.S. Patent Application 2006/0086834 by Pfeffer et al. teaches "coupling the flow of a fluidizing gas with one or more external forces, the combined effect is advantageously sufficient to reliably and effectively fluidize a chamber or bed of nanosized powders." [U.S. Patent Application 2006/0086834 at [0024]]. Pfeffer et al. describe external forces to include: "magnetic, acoustic, centrifugal/rotational and/or vibration excitation forces." [See, also, Yang, Wen-Ching. "Fluidization of Fine Cohesive Powders and Nanoparticles—A Review," Journal of the Chinese Institute of Chemical Engineers, 36(1), X, (2005).]

Sound assisted fluidization is outlined by Zhu et al. as a method for enhancing fluidization. [Zhu, Chao, Guangliang Liu, Qun Yu, Robert Pfeffer, Rajesh N. Dave, Caroline H. Nam, "Sound assisted fluidization of nanoparticle agglomerates," Powder Technology, 141, 119 (2004).] Further, Martens describes reducing the average size of particles or agglomerates suspended in a fluid by combining with a second fluid which includes a metallic compound and flowing the combined fluid through one or more magnetic fields. [U.S. Patent Application 2005/0127214 to Martens, published on Jun. 16, 2005.]

Alfredson and Doig describe a method for increasing fluidization of particles having diameters of less than about 50 μm by using fluidizing pulses. [Alfredson, P. G., I. D. Doig. "A Study of Pulsed Fluidization of Fine Powders," Chemeca '70, 117, (1970).] According to Alfredson et al., providing the fluidizing medium in a series of pulses was shown to overcome channeling and poor gas-solids contact for fine particles.

Studies at Monash University by Akhavan and Rhodes analyzed pulsed fluidization of cohesive powders which involved varying the velocity of the fluidization medium as a function of time. [http://users.monash.edu.au/~rhodes/projects.htm#2 on Aug. 22, 2006.] The studies of Akhavan et al. suggest oscillating a portion of the fluid flow by supplying a constant flow and a pulsed flow into a windbox of a fluidized bed. Akhavan suggests that "this new bed structure can be sustained for a considerable period of time after the pulsation is stopped." [http://www.eng.monash.edu.au/chemeng/seminars/akhavan %20_25may-06.pdf#search=%22ali%20 akhavan%2C%20pulsed%22 on Aug. 22, 2006.]

U.S. Pat. No. 6,685,886 to Bisgrove et al. teaches using a fluidization supply system in combination with an agitation system and a spray gun to supply a fluid via a duct to particles resting on a screen. Bisgrove et al. disclose spray guns configured to force particles back down into the expansion chamber to foster growth of the particles. Bisgrove et al. state that "spray gun 74 continues to spray solution until the particles P have been enlarged to the desired size from coatings or agglomeration. At that point, the spray gun 74 is turned off . . . the agitation system 12 continues to agitate the particles P in the bed 22 of the product chamber 14 to prevent undesired agglomerations from occurring."

U.S. Pat. No. 4,007,969 to Aubin et al. discloses a device for fluidizing and distributing a powder in a gas suspension. Aubin et al. disclose that "the pressurized gas, carrying a powder made of a mixture of particles, grains and agglomerates, is fed from a distributing means (not shown), located upstream of inlet conduit 10." Aubin et al. further disclose that "[t]his fluidization step results both from the interaction of the two carrier-gas jets at the extremity of nozzles 22, 24, and from the spherical shape of chamber 20." [Col. 2, lines 35-39.] Aubin et al. state that their disclosed system is capable of "extending its range of use to very fine powders, of a grain-size of about 1 micron or less."

In U.S. Patent Application 2005/0127214, Marten et al. disclose a method for reducing the average size of metallic compound particles or agglomerates suspended in a fluid. The system of Marten et al. involves flowing a fluid with metallic compound particles or agglomerates suspended through a magnetic field to reduce the average size of a substantial portion of the metallic compound particles or agglomerates by at least 25%.

In U.S. Patent Application 2005/0274833, Yadav, et al. disclose a system for reducing agglomerates to particles through "shear forces, or other type of stress," e.g., "a ball mill, or jet mill, or other types of mill, or sonication, or impaction of particles on some surface." Yadav et al. further disclose using an elevated temperature, in combination with a catalyst, such as a solvent, to reduce agglomerate size.

U.S. Pat. No. 4,261,521 to Ashbrook describes a method for reducing molecular agglomerate size in fluids. Two vortex nozzles are positioned opposite each other and fluid flow from the nozzles is controlled so that the fluid from one nozzle rotates in an opposite direction to fluid emerging from a second nozzle. The fluid streams collide and the collision reduces agglomerate size.

U.S. Pat. No. 4,095,960 to Schuhmann, Jr. discloses a process and apparatus for converting particulate carbonaceous fuel, such as high-sulfur bituminous coal, into a combustible gas. An ignited fluidized bed of the particulate carbonaceous fuel is formed in a closed-bottom shaft furnace and a jet stream of oxygen is directed downward into the bottom zone by means of an oxygen lance passing axially through a roof enclosure. The oxygen stream forms a dynamic, highly turbulent suspension of particulate fuel. Particulate reaction products travel in a toroidal manner in the bottom zone of the fluidized bed, continuously removing effluent gases formed by reaction of oxygen with the fluidized bed, and maintaining the fluidized bed by continually feeding makeup fuel to the shaft furnace. In a bench-scale reactor, a very small orifice (approximately 0.025 inch in diameter) is drilled into the nozzle end of the lance.

U.S. Pat. No. 5,133,504 to Smith et al. discloses a fluidized bed jet mill that includes a grinding chamber with a peripheral wall, a base, and a central axis. An impact target is mounted within the grinding chamber and centered on the chamber's central axis. Multiple sources of high velocity gas are mounted in the peripheral wall of the grinding chamber, are arrayed symmetrically about the central axis, and are oriented to direct high velocity gas along an axis intersecting the center of the impact target. Alternatively, the sources of high velocity gas are oriented to direct high velocity gas along an axis intersecting the central axis of the grinding chamber. Each of the gas sources has a nozzle holder, a nozzle mounted in one end of the holder oriented toward the grinding region, and an annular accelerator tube mounted concentrically about the nozzle holder. The accelerator tube and the nozzle holder define between them an annular opening through which particulate material in the grinding chamber can enter and be entrained with the flow of gas from the nozzle and accelerated within the accelerator tube to be discharged toward the central axis. In a disclosed embodiment, an Alpine model AFG 100 mill with three nozzles is disclosed, each nozzle having an inside diameter of approximately 4 mm and an outer diameter of about 1.5 inches.

U.S. Pat. No. 6,942,170 to Casalmir et al. discloses a jet mill that includes plural nozzle devices for discharging a composite stream of high velocity fluid. Each nozzle device includes a plural odd number of nozzle openings for discharging an individual stream of high velocity fluid. In a disclosed embodiment, five (5) PONBLO nozzle devices having nozzle size of 15 mm were utilized.

In a publication entitled "Fluidization of Fine Powders in Fluidized Beds with an Upward or a Downward Air Jet," the authors describe a study directed to the hydrodynamic behavior of fine powders in jet-fluidized beds. [R. Hong, J. Ding and H. Li, "Fluidization of Fine Powders in Fluidized Beds with an Upward or a Downward Air Jet," China Particuology, Vol. 3, No. 3, pages 181-186, 2005.] As stated by Hong et al. at page 181:

> Study on a fluidized bed with a downward jet is both theoretically and practically important. Shen et al. (1990a; 1990b) studied experimentally a downward gas jet in a two-dimensional fluidized bed. Werther and Xi (1993) investigated the jet attrition of catalyst particles in a gas-fluidized bed with a downward jet.

In the Shen et al. study referenced above, the jet nozzle velocity was 51 to 124 m/s and the nozzle diameter was 6 mm. In the Werther and Xi investigation referenced above, the nozzle size was 0.5 and 2 mm and the nozzle velocity was 100 m/s. As further stated in the Hong et al. publication at page 181, "[g]as jets with high speed were used to break up the agglomerates of cohesive powders to improve fluidization quality. A downward jet was used instead of an upward jet in order to avoid jet penetrating through the entire bed." The experimental work and technical discussion provided by Hong et al. is limited to the fluidization of Geldart type A FCC particles, and cohesive glass beads of mean size of 40 μm and the use of relatively large nozzles for the generation of the jets.

Despite efforts to date, a need remains for effective, reliable and cost effective systems and methods for fluidizing particle and powder systems that are resistant to fluidization, e.g., based on high inter-particle forces. In particular, a need remains for effective, reliable and cost effective systems and methods for fluidizing beds that include nanoparticles and/or nanopowders. These and other needs are satisfied by the systems and methods disclosed herein.

SUMMARY

The present disclosure provides advantageous systems and methods for enhancing fluidization of nanoparticles and/or nanopowders. According to exemplary embodiments, a fluidization chamber is provided with a fluidizing medium (e.g., a fluidizing gas) directed in a first fluidizing direction, e.g., upward into and through a bed containing a volume of nanoparticles and/or nanopowders. A second source of air/gas flow is provided with respect to the fluidization chamber, the second air/gas flow being oppositely (or substantially oppositely) directed relative to the fluidizing medium. For example, one or more nozzles may be positioned in or with respect to the fluidization chamber such that the flow of fluid from the nozzle(s) is opposite (i.e., downward or substantially downward) relative to the flow of the fluidizing medium which is upward.

The position, size, shape, orientation and throughput of such downwardly directed nozzles may vary to some degree based on a host of factors, e.g., the characteristics of the nanoparticles/nanopowders that are being fluidized, the size/geometry of the fluidization chamber, the desired degree of fluidization, etc. Generally, the denser the particles positioned within the fluidization chamber, the closer the nozzle discharge is to the distributor plate in order to provide full fluidization of the entire amount of powder. For enhanced fluidization of nanoparticles and/or nanoagglomerates, it has been found that micro jets are particularly effective in enhancing fluidization performance. For purposes of the present disclosure, micro-jets generally define spray aperture diameters in the range of about 100 μm to about 500 μm, although apertures that fall slightly outside the above-noted range may be employed without sacrificing beneficial fluidization performance as described herein. Of note, in an alternative embodiment and depending on the application, the second air/gas flow is directed in the same (or substantially in the same) direction as the fluidizing medium.

Fluidization performance is generally enhanced according to the disclosed fluidization system. Turbulence created by the jet from the micro jet nozzle (or plurality of micro jet nozzles) is advantageously effective to aerate the nanoagglomerates and the shear generated by such micro jet flow is effective to break apart nanoagglomerates and/or reduce the tendency for nanoagglomerates to form or reform. In some cases, when one or more micro jet nozzles are pointing downwards, the flow going in the opposite direction (i.e., upward) through the gas distributor plate can be reduced to zero, although more efficient processing of the nanoagglomerate powder occurs with the presence of upward fluidization gas flow. In addition, the oppositely directed fluid flow introduced to the fluidization chamber by the disclosed micro-jet(s) facilitates powder circulation within the fluidization chamber, thereby enhancing fluidization results. Thus, the nanoparticles and/or nanopowders are distributed over a larger portion of the bed.

Use of oppositely directed fluid flow, e.g., downwardly directed fluid flow introduced by one or more micro-jets, is believed to transition a bed that is exhibiting agglomerate bubbling fluidization behavior (herein referred to as "ABF") into a bed that exhibits agglomerate particulate fluidization behavior (herein referred to as "APF"). Indeed, as demonstrated in the experimental results set forth below, even systems that exhibit APF behavior under normal conditions show a significant bed expansion or increase in fluidized bed height when fluidized using the disclosed fluidization system with oppositely directed, micro jet fluid flow.

The benefits of the disclosed fluidization systems and methods are substantial and, in exemplary implementations, extend beyond the period during which an oppositely directed micro-jet or countercurrent flow is in operation. For example, conventional fluidization nanoparticle systems that are modified to include the disclosed oppositely directed fluid flow have been found to exhibit at least two (2) times the level of bed expansion relative to conventional fluidization (fluidization at equal gas velocity without the disclosed oppositely directed fluid flow) and as much as ten (10) times the level of bed expansion relative to conventional fluidization. The expanded bed height, however, can be as much as fifty (50) times the initial bed height. For example, if an APF type nanopowder, such as Aerosil® R974 silica, is poured into the fluidization column to an initial bed height of 5 cm and the bed is fluidized conventionally, the bed may expand by a factor of 5 to a height of 25 cm. If this same nanopowder is processed to include the disclosed oppositely directed fluid flow using micro jet nozzles, the bed may expand to a height of up to 250 cm, 10 times the bed expansion of a conventionally fluidized bed and 50 times the initial bed height.

Further, when performing batch fluidization, the flow of gas through the oppositely directed micro jets may be discontinued after the foregoing beneficial results are first achieved, thereby allowing the fluidized bed to remain at an enhanced steady state condition. Even when the oppositely directed fluid flow is discontinued, bed expansion remains at highly advantageous levels, e.g., more than double the expansion of the bed when no jets/countercurrent flow were introduced to the fluidization chamber. In addition, a reduced bulk density of the powder has been observed, which suggests a desirable reduction in the agglomerate density within the fluidization chamber, and the fluidization system is advantageously devoid (or substantially devoid) of bubbling, thereby enhancing fluidization performance and utility (e.g., for coating operations, reaction efficiency and the like). For continuous fluidization systems where solids are passing through the system/apparatus, it may be undesirable to discontinue flow through the micro jet nozzles to obtain beneficial results. Also, depending on the configuration of the fluidization system, the micro-jet nozzles can provide advantageous results regardless of their direction (downward/upward).

Although the fluidization systems and methods disclosed herein are particularly advantageous for fluidization chambers that contain nanoparticles/nanopowders, the systems and methods described herein may be expected to extend to other fine/cohesive particle systems, e.g., particles that are less than 30 microns (Geldart Group C particles). Further advantages are achieved according to the disclosed fluidization method/system, e.g., a suppression of bubbling and spouting within the fluidization chamber, enhanced dispersion of the nanoparticles/nanopowder in the gas phase, and/or destruction/break-up of large agglomerates.

Of further note, the disclosed multi-flow system and associated methodology are easily implemented. Oppositely directed fluid flow using one or more micro-jet nozzles may be retrofit on existing fluidization equipment and/or readily incorporated into new fluidization equipment manufacture. Unlike many currently available systems, the reverse micro jet system does not require addition of foreign materials into the fluidized bed or other material alterations to conventional fluidization techniques and systems.

Additional features, functions and benefits of the disclosed fluidization systems and methods will be apparent from the detailed description which follows, particularly when read in conjunction with the accompanying figures.

BRIEF DESCRIPTION OF THE ACCOMPANYING FIGURES

To assist those of ordinary skill in the art in making and using the disclosed fluidization systems and methods, reference is made to the accompanying figures, wherein:

FIG. 1 is a schematic diagram of an exemplary fluidized bed that includes a downwardly-directed micro jet nozzle for enhancing fluidization of nanoagglomerates and nanoparticle systems according to the present disclosure.

FIG. 2 is a plot showing non-dimensional fluidized bed height for Aerosil® R974 silica plotted against gas velocity. The initial bed height was 5 cm (9.5 g of fresh powder) and the Aerosil® R974 silica shows an APF behavior. Other amounts of fresh powder, i.e., 13 g and 20 g were also used in the experiments giving initial bed heights of 7.6 and 11.6 cm.

However, when conventionally fluidized after micro-jet processing as disclosed herein, a significantly larger bed expansion was observed.

Figure 6:
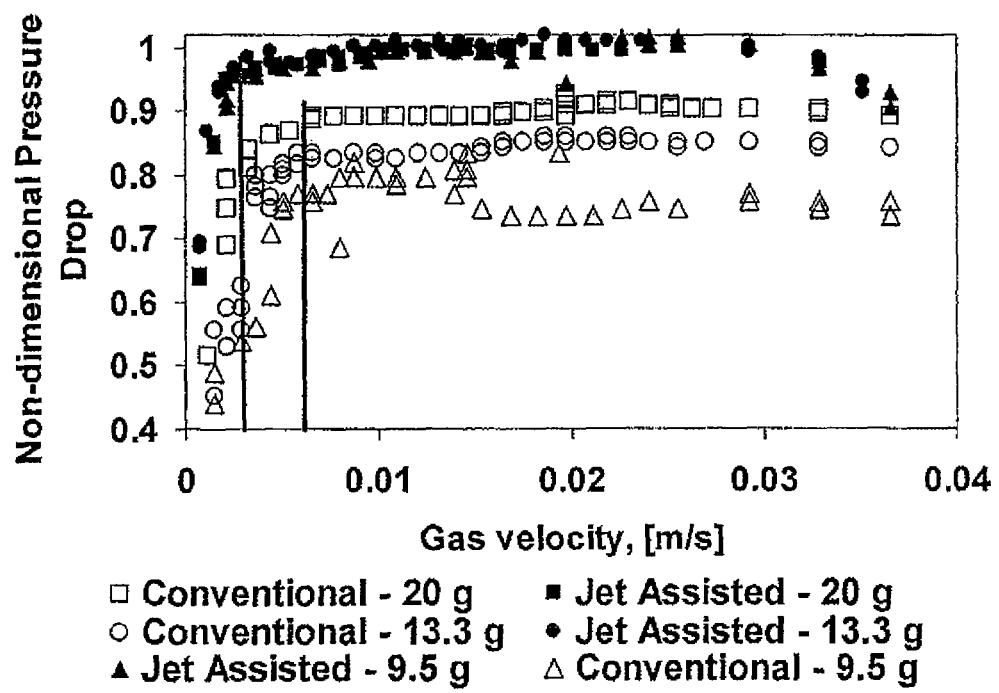

FIG. 6 shows fluidized bed pressure drops for different amounts of Aerosil® R974 silica. It can be clearly seen that the amount of powder fluidized when using the micro jet assistance of the present disclosure is larger than in conventional fluidization as indicated by the measured pressure drop which is close to the apparent weight of the particles. For conventional fluidization without micro-jet assistance, lower pressure drops are measured indicating that not all the powder is fluidized. Full fluidization of all of the powder contained in the fluidization column is only achieved with a downwardly directed micro jet flow.

Figure 7:
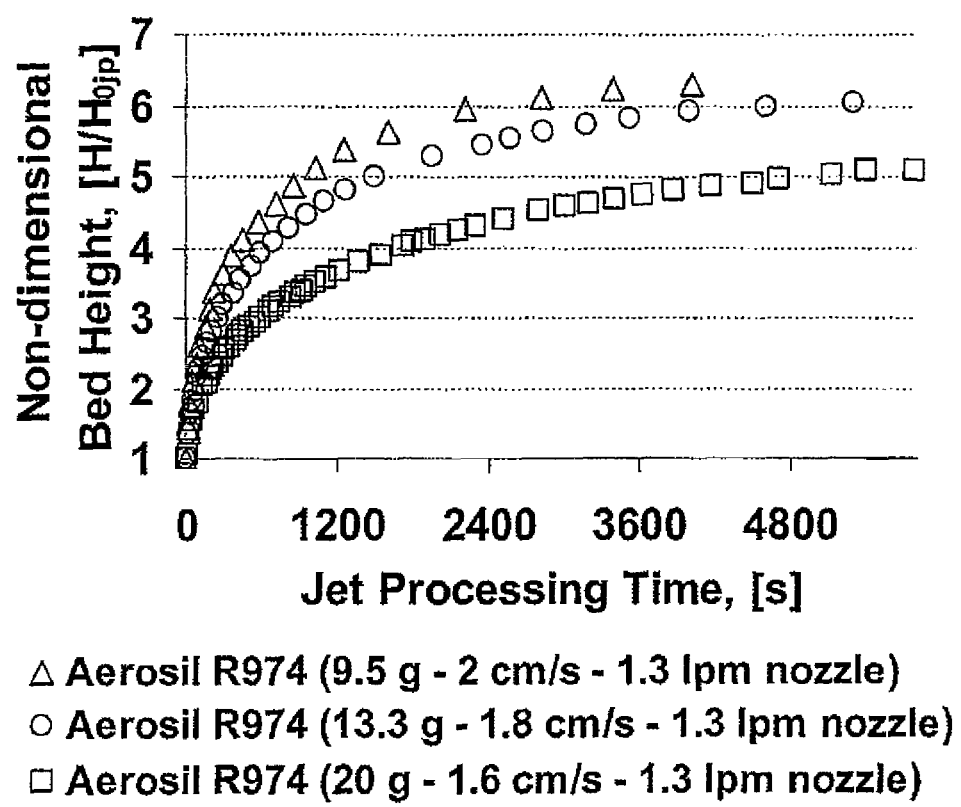

FIG. 7 is a plot of the evolution of the fluidized bed height during processing of the powder by the micro jet for an Aerosil® R974 silica system.

Figure 8:
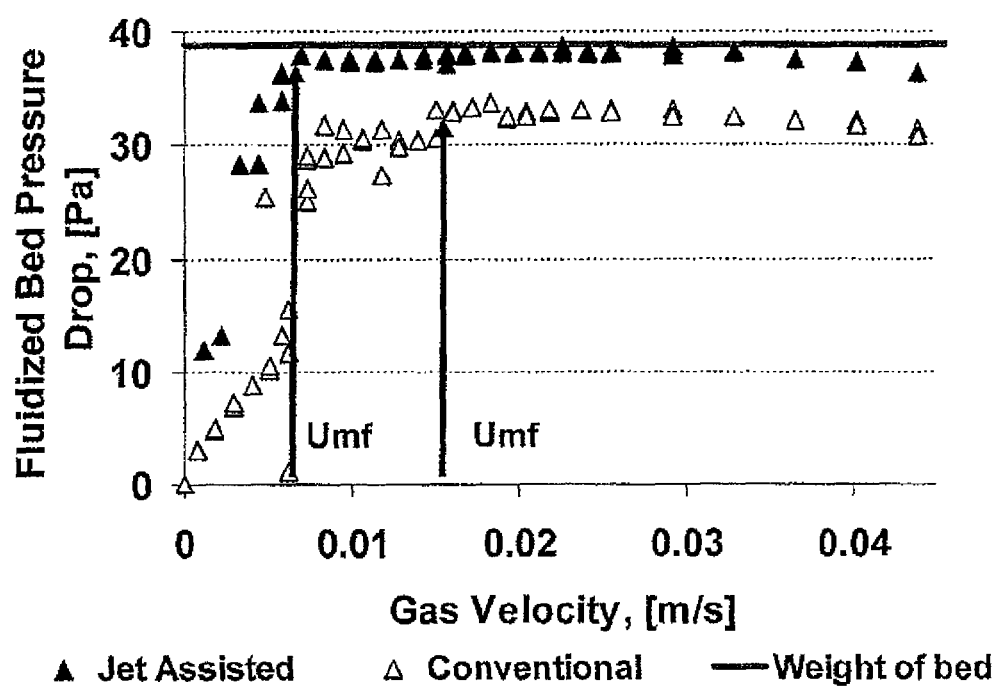

FIG. 8 shows the fluidized bed pressure drop of conventional and micro jet assisted Aerosil® 90 (APF) silica systems. A significant reduction in the minimum fluidization velocity can be seen. Also, more powder is suspended by the gas flow when the downwardly directed micro jet is used as the experimental pressure drop is close to the apparent weight of the particles as noted on the plot.

Figure 9:
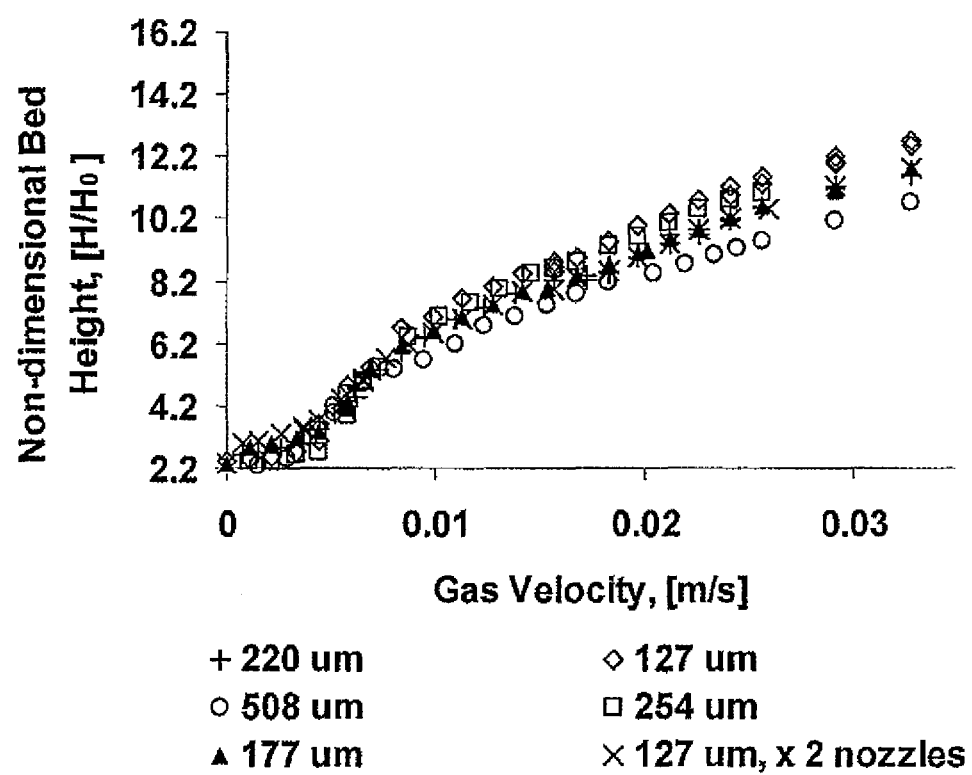

FIG. 9 shows the bed expansion or fluidized bed height for Aerosil® 90 silica systems assisted with various micro jet nozzle sizes.

Figure 10:
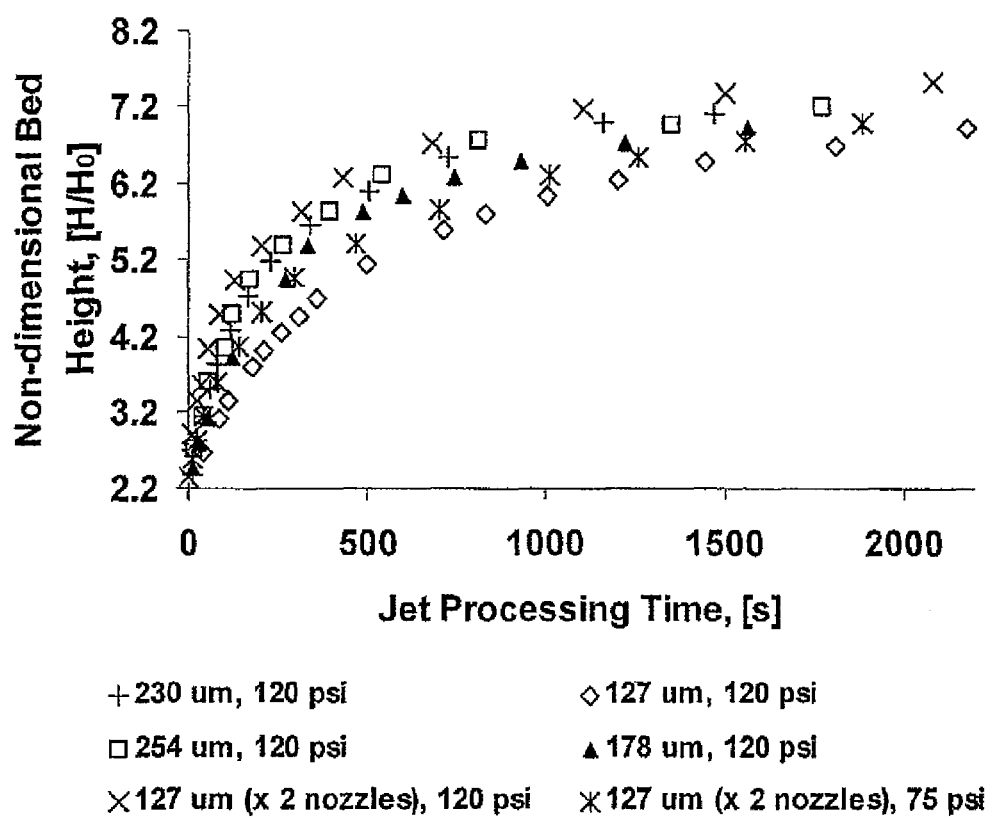

FIG. 10 is a plot of the evolution of the fluidized bed height during processing of the powder by micro jets generated by different nozzle sizes for an Aerosil® 90 silica system during jet processing (bed expands even though the gas velocity is constant).

Figure 11:
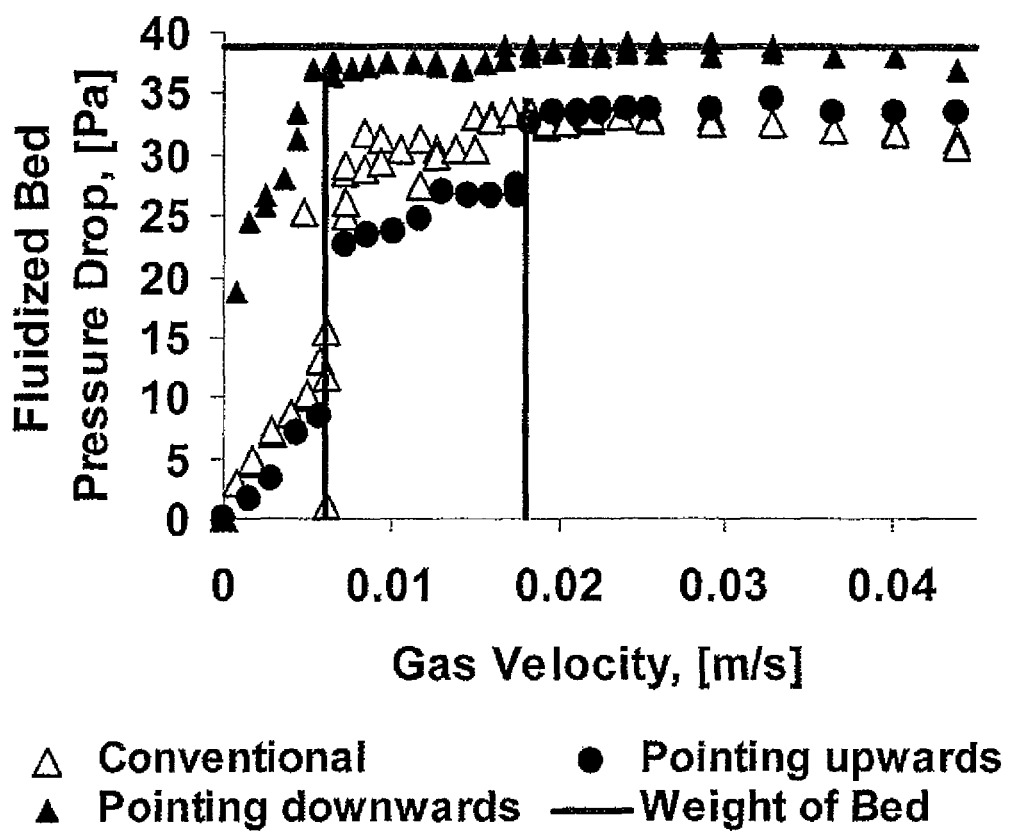
Figure 12:
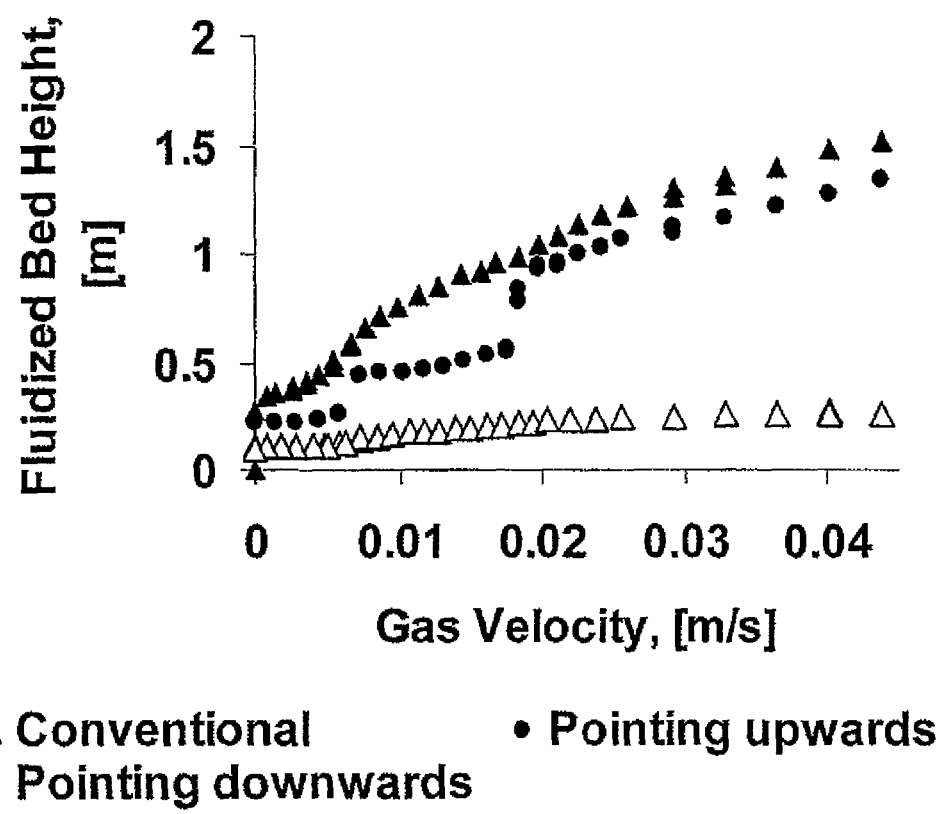

FIGS. 11-12 are plots of fluidization performance for Aerosil® 90 silica systems with varying nozzle orientations.

Figure 13:
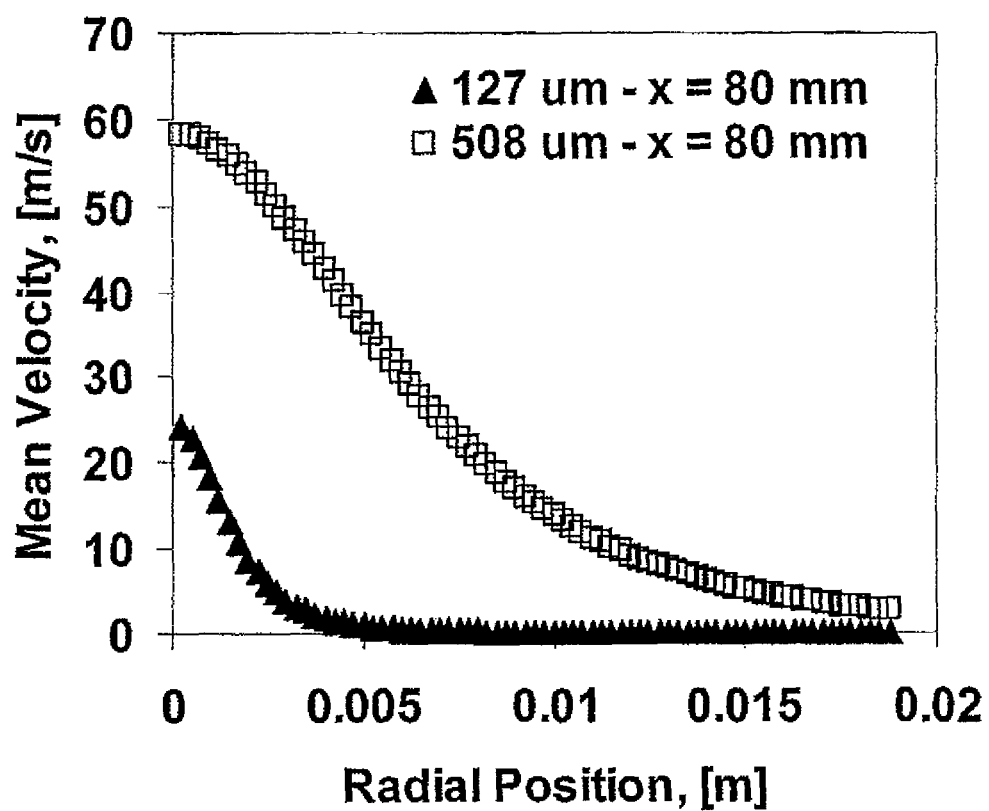
Figure 14:
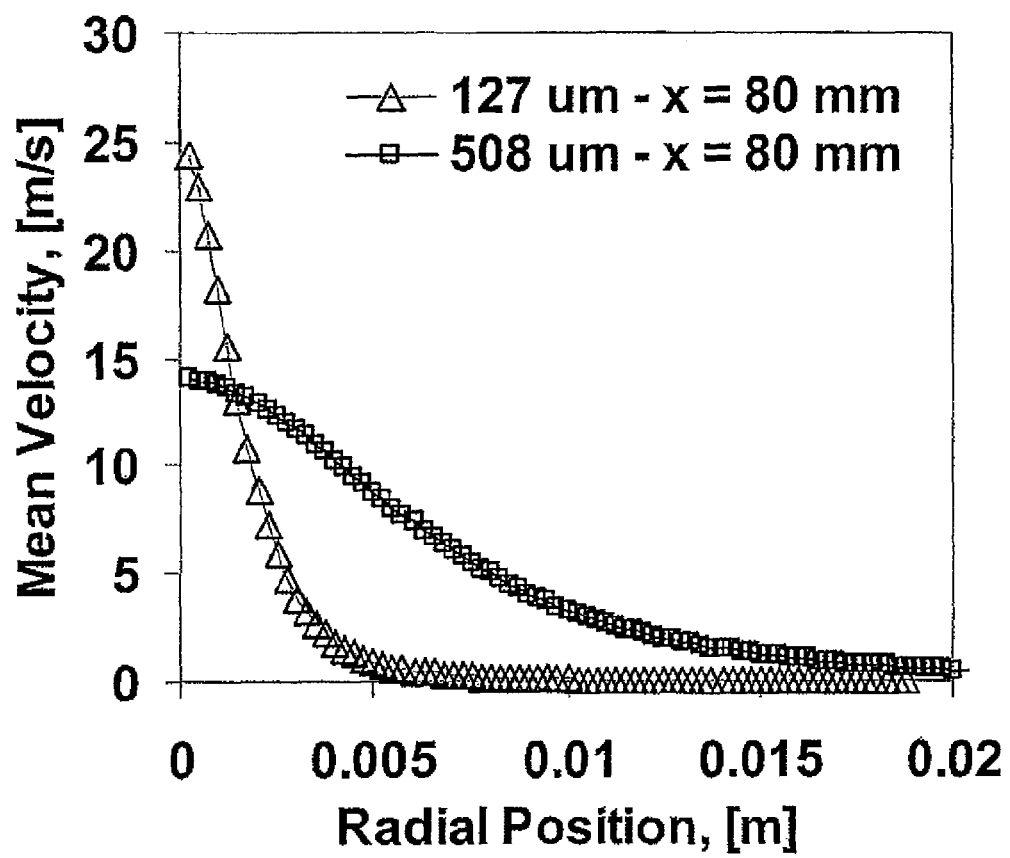

FIGS. 13-14 are plots reflecting jet axial velocity as a function of radial position at different distances from the nozzle (20, 50 and 200 mm).

Figure 15:
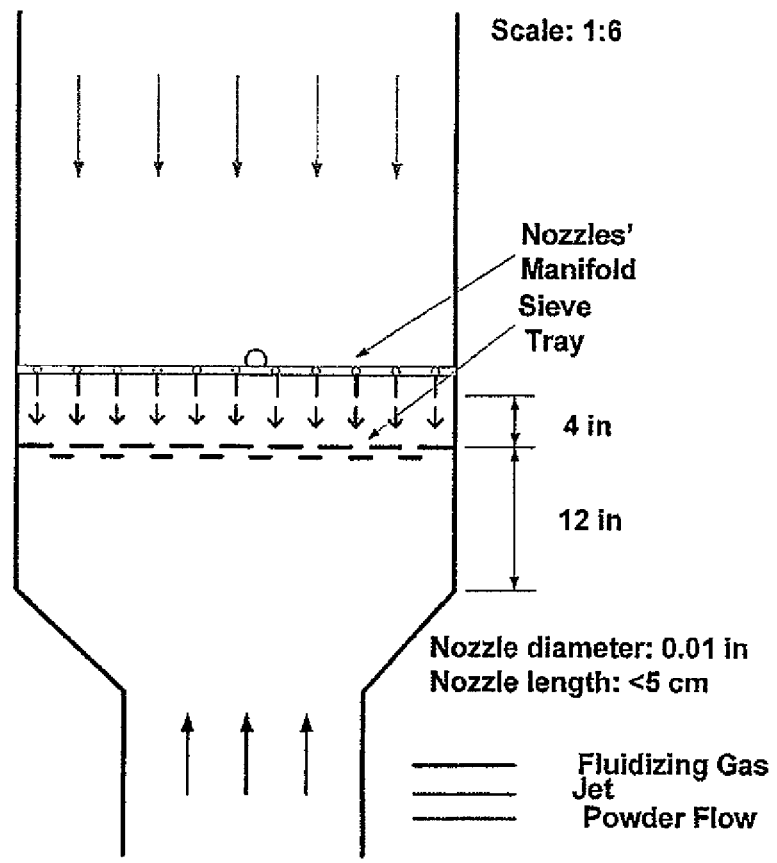
Figure 16:
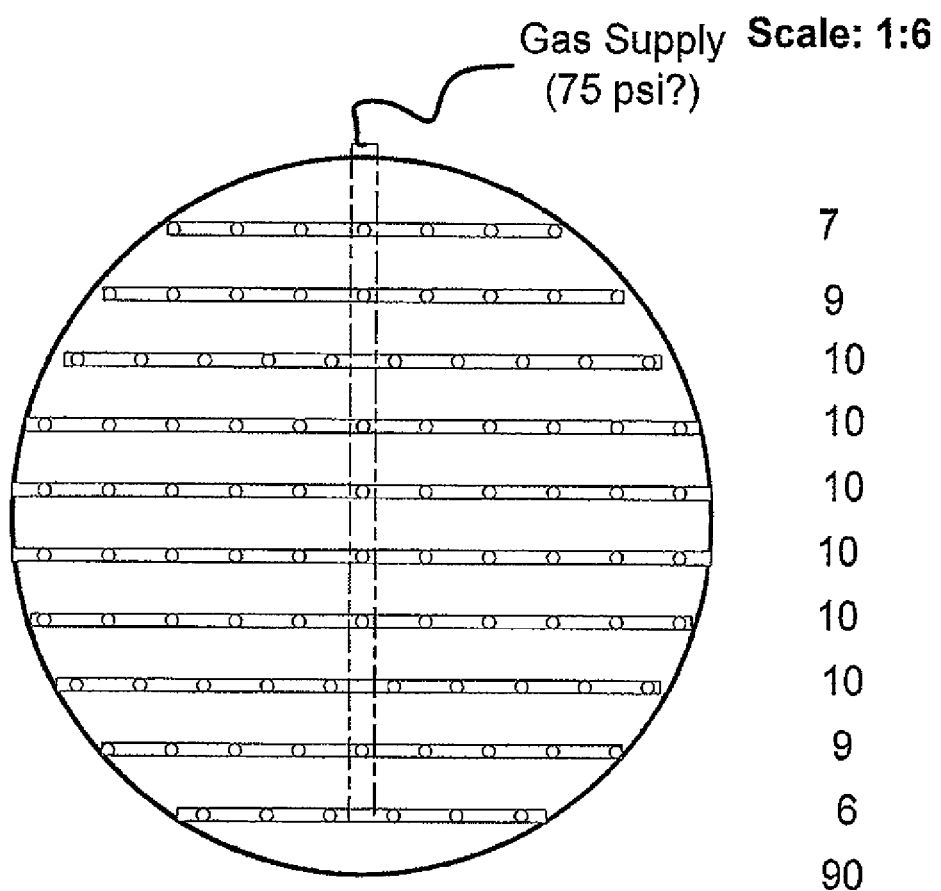
Figure 17:
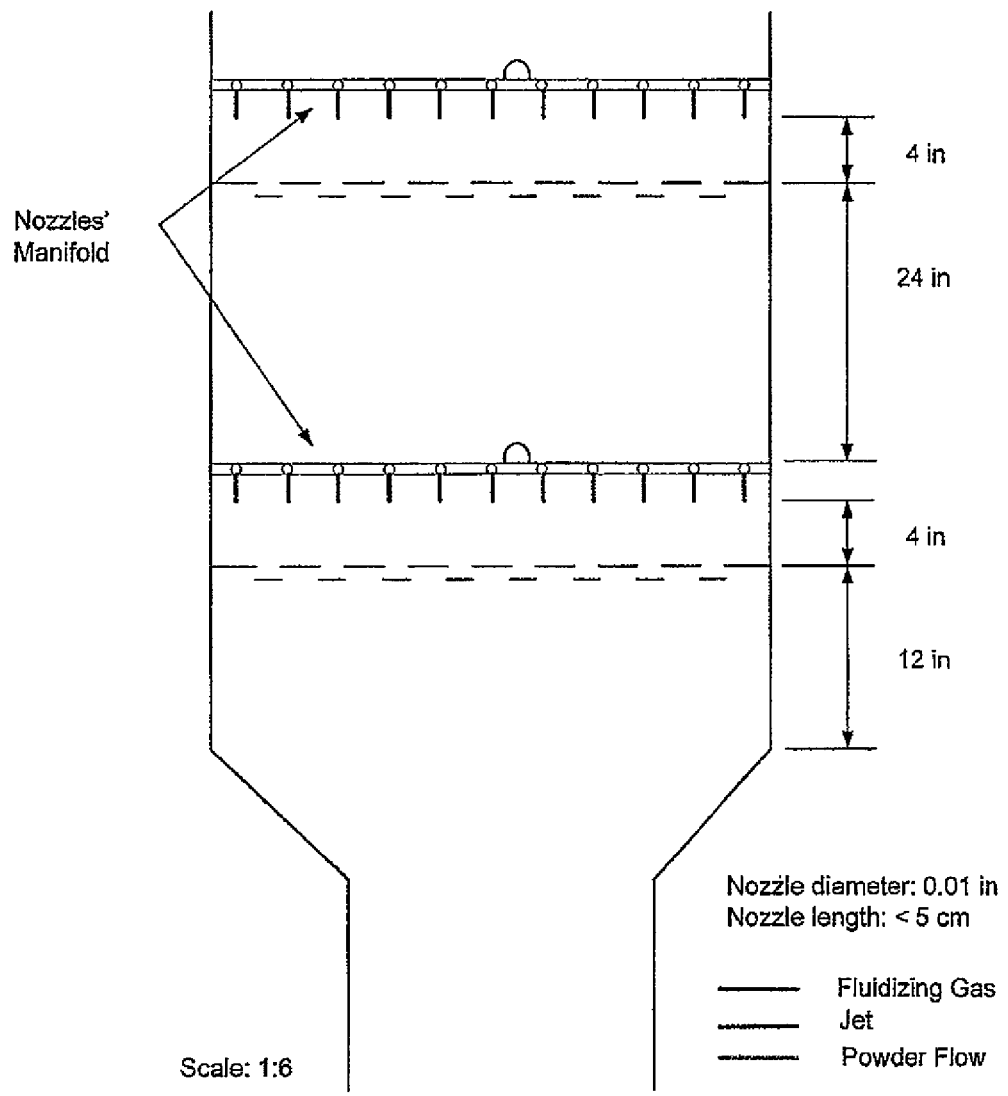

FIGS. 15-17 are schematic diagrams related to potential scaled-up systems for use according to the present disclosure for a vessel diameter of about 0.6 m.

DESCRIPTION OF EXEMPLARY EMBODIMENT(S)

Methods and systems for increasing fluidization of nanoparticles and/or nanopowders are disclosed that generally include a fluidization chamber with a fluidizing medium directed in a first fluidizing direction, e.g., upward, and a second source of air/gas flow oppositely (or substantially oppositely) directed relative to the fluidizing medium. In exemplary embodiments, one or more micro jet nozzles are positioned to deliver fluid flow into the fluidization chamber in an opposite direction relative to the fluidization medium. As described herein, the position, size, shape, orientation and throughput of such downwardly directed nozzles may vary to some degree based on a host of factors, e.g., the characteristics of the nanoparticles/nanopowders that are being fluidized, the size/geometry of the fluidization chamber, the desired degree of fluidization, etc. Generally, the denser the particles positioned within the fluidization chamber, the closer the nozzle discharge is to the distributor plate.

Of note, enhanced fluidization of nanoparticles and/or nanoagglomerates has been found to result from the use of micro jets that define aperture diameters in the range of about 100 μm to about 500 μm, although apertures that fall slightly outside the above-noted range may be employed without sacrificing beneficial fluidization performance as described herein.

Use of gas jets coming from micro-nozzles is believed to transition a bed that is exhibiting agglomerate bubbling fluidization behavior (herein referred to as "ABF") into a bed that exhibits agglomerate particulate fluidization behavior (herein referred to as "APF"). Indeed, as described herein, even systems that exhibit APF behavior under normal conditions show a significant increase in fluidized bed height when fluidized using the disclosed fluidization system with oppositely directed fluid flow. For batch fluidization, the use of the downward flow provides an advantageous configuration to enhance the full fluidization of nanopowders and/or nanoagglomerates. Nevertheless, the use of jets pointing in a direction other than downwards will also enhance fluidization at least to the extent the fluidized nanopowder is exposed to action of the jets from the micro-nozzles.

Conventional fluidization systems that include the disclosed oppositely directed fluid flow have been found to exhibit approximately two (2) to ten (10) times the level of bed expansion relative to conventional fluidization. In certain implementations (e.g., batch fluidization), the flow of gas through the oppositely directed jets may be discontinued after effective fluidization is achieved, thereby allowing the fluidized bed to settle at an enhanced steady state condition. Even when the oppositely directed fluid flow is discontinued, bed expansion remains at highly advantageous levels, e.g., more than double the expansion of the bed when no jets/countercurrent flow were introduced to the fluidization chamber. In addition, a reduced bulk density of the powder has been observed, which suggests a desirable reduction in the agglomerate density within the fluidization chamber, and the fluidization system is advantageously devoid (or substantially devoid) of bubbling, thereby enhancing fluidization performance and utility (e.g., for coating operations, reaction efficiency and the like).

Of further note and as will be apparent to persons skilled in the art, the disclosed multi-flow system and associated methodology are easily implemented. The disclosed oppositely directed fluid flow using one or more micro-jet nozzles may be retrofit on existing fluidization equipment and/or readily incorporated into new fluidization equipment. Unlike many currently available systems, the disclosed reverse micro-jet systems and methods do not require addition of foreign materials into the fluidized bed or other material alterations to conventional fluidization techniques and systems.

Fluidization of nanoagglomerates and/or nanopowders is particularly challenging. For example, agglomerates of nanoparticles behave differently from Geldart Group A micron-sized particles even though the agglomerates may be of similar size as Group A particles. Geldart Group A particles will generally fluidize well without special processing considerations. On the other hand, agglomerates of nanoparticles, e.g., systems that include titania or hydrophilic fumed silica, fluidize very poorly, with significant bubble generation and gas bypass through the bed. However, when the disclosed downwardly directed micro-jet(s) are added to the fluidization system, these particles (agglomerates of nanoparticles) fluidize smoothly, at much lower velocities, with large bed expansion and no bubbles. Among the advantages associated with the disclosed nanoparticle/nanoagglomerate fluidization methodology are high gas velocities at the jet, enhanced levels of turbulence, the elimination (or substantial elimination) of dead-zones in the fluidization bed, i.e., all of the powder is fluidized, better mixing between phases, and a reduction of agglomerate size and density due to shear at the jet.

For purposes of the present disclosure, nanopowder/nanoagglomerate systems may be classified according to their fluidization behavior, as follows:

Agglomerate Particulate Fluidization (APF): Smooth liquid-like fluidization, large bed expansion, fluidization occurs at relatively low gas velocities, minimal loss or elutriation of particles.

Agglomerate Bubbling Fluidization (ABF): Uneven fluidization (spouting and channeling), large bubbles resulting in gas-bypassing, limited bed expansion, fluidization occurs at relatively high gas velocities, substantial loss or elutriation of particles.

Of note, the disclosed fluidization systems/techniques that include secondary flow injection are effective in enhancing fluidization in a host of nanoparticle/nanopowder systems, including specifically nanopowder/nanoagglomerate systems showing ABF behavior.

It is well known in gas-solid fluidization that nanoparticles cannot be fluidized as individual particles but only in the form of large agglomerates. Nanoparticle agglomerates form as a consequence of the large cohesive (van der Waals) forces that are present due to the small size and large specific surface of the nanoparticles. Several problems arise as a consequence of the formation of large agglomerates in a fluidized bed of nanoparticles. Depending on the type of material and/or surface treatment of the particles, problems such as bubbling, channeling, spouting and the formation of large clusters hinder the smooth fluidization of nanopowders.

Figure 1:
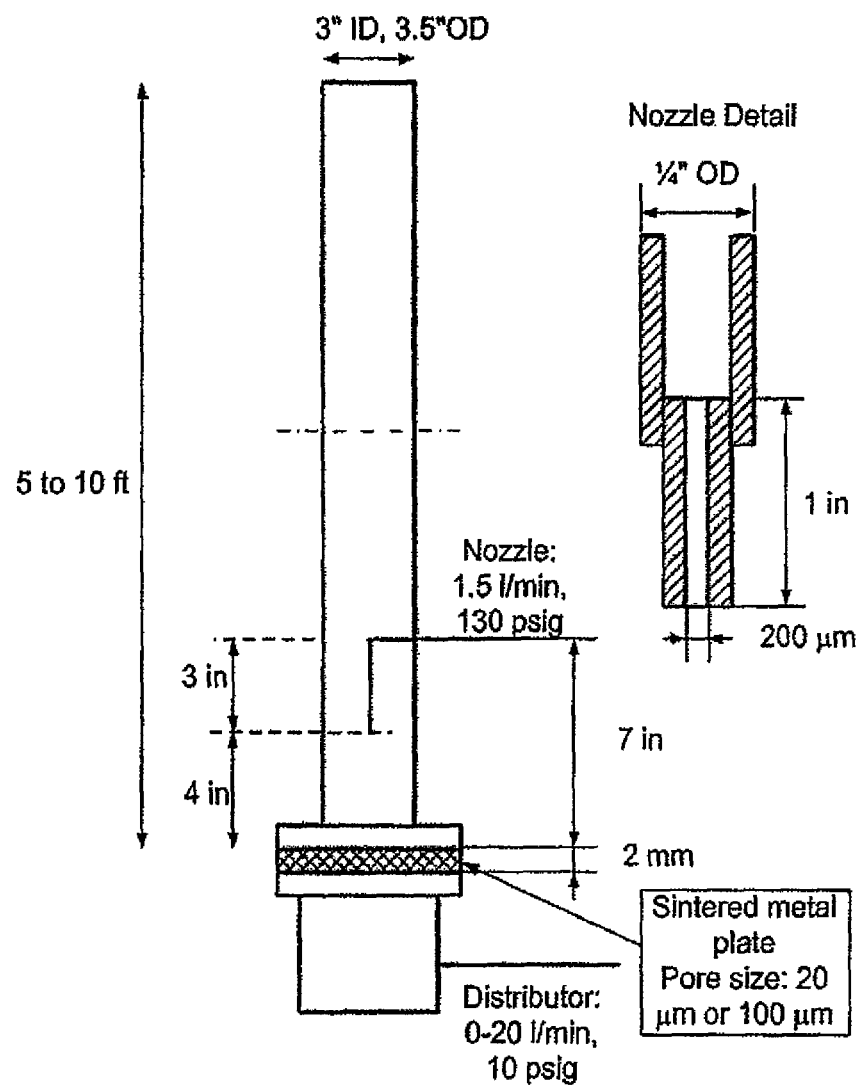
Figure 5:
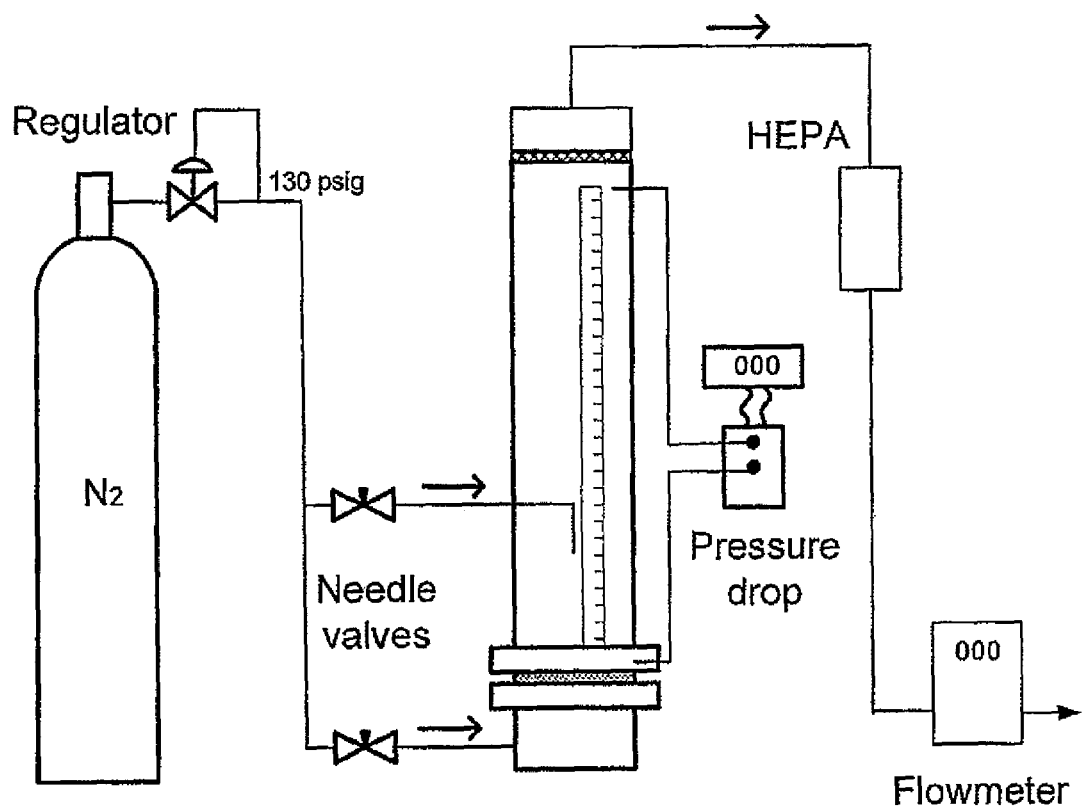
FIG. 5 is a schematic diagram of a processing system according to an exemplary embodiment of the present disclosure.

With reference to FIGS. 1 and 5, exemplary systems for fluidizing nanoparticle and nanoagglomerate systems are schematically depicted. The exemplary systems include one or more micro jet nozzles pointing downward in the opposite direction relative to the flow of the fluidizing gas (which is directed upward). The micro jet nozzle(s) are typically located above the gas distributor by a distance of about 1 inch to about 7 inches. Positioning of the micro-jet nozzle(s) relative to the gas distributor is generally based on the powder to be fluidized. For example, denser powders generally require the micro jet nozzle(s) at a closer distance relative to the distributor plate as compared to "fluffy" or less dense powders.

Micro jet nozzle selection may also vary from implementation-to-implementation. Selection of an appropriate micro-jet nozzle size for a particular application may depend on a variety of factors, including specifically the amount of gas required to be injected and the shear required to break the agglomerates. The pressure upstream of the micro-jet nozzle(s) will depend in part on the nozzle size selected according to the required conditions. Usually, the upstream pressure determines the amount of energy consumed by the system. The internal diameter of the micro jet nozzle can vary, e.g., from 0.1 up to 0.5 millimeters (100 to 500 µm), and a pressure upstream of the micro-jet nozzle(s) greater than 100 psi is generally desired, although for micro jet nozzles as large as 0.5 millimeters, a pressure of about 20 psi is sufficient to enhance fluidization. The pressure feeding the micro-jet nozzles will depend on the application. The smaller the micro jet nozzle, the larger pressure required to generate the desired fluid flow.

With further reference to FIG. 1, a laboratory scale fluidization column that uses one reversed micro-jet nozzle for enhancing fluidization of nanopowders is depicted. An exemplary laboratory scale fluidization column is 3 inches in diameter; a larger column of 5 inch diameter was also used in testing according to the present disclosure. As can be seen in FIG. 1, the flow through the downwardly directed micro jet nozzle is generally a relatively small fraction of the upward fluidizing gas flow, e.g., on the order of 10% (e.g., 20 l/min through the distributor vs. 1.5 l/min through the micro-jet nozzle), although this depends on the powder to be processed; in some cases, for example, for Aeroxide $TiO_2$ P25, the flow through the downwardly directed micro jet nozzle was about 50% of the upward fluidizing gas flow. In general, the ratio of the downward jet flow and the upward fluidizing flow has to be optimized according to the application.

It is important to note that while the jet flow is generally constant after setting the upstream pressure through the micro-jet nozzle(s), the primary upward fluidizing flow can be changed over a wide range. A variety of gases may be employed according to the present disclosure, both as fluidizing gases and downwardly directed gases, as will be readily apparent to persons skilled in the art. Indeed, the same gas need not be employed for both upward and downward fluid flow. In the tests described herein, nitrogen was employed as the upward fluidizing gas and the downwardly directed gas through the micro jet nozzle.

Thus, with further reference to the schematic diagram of FIG. 5, an exemplary column employed according to the present disclosure included a column having an inner diameter of 3 inches (76.2 mm). Among the variables investigated with the set-up of FIG. 5 was bed height and pressure drop in connection with fluidization operation. Operational parameters that were controlled/manipulated during exemplary tests included flow rates, nozzle sizes, direction and position, and powder types. Micro-jet nozzles utilized in exemplary tests performed according to the present disclosure ranged from 127 µm to about 508 µm. As described herein, nanopowders that have been studied include Degussa Aerosil®: R974, 200, 90, Raw 90, and Aeroxide® $TiO_2$ P25, Alu C.

The jet/flow produced by the downwardly directed micro jet nozzle(s) enhances fluidization at least in part by breaking up agglomerates and increasing the dynamics of the fluidized bed, particularly at the bottom of the bed. Usually, the bottom of the fluidized bed is denser than the top, but the downwardly directed jet/flow is generally effective in aerating the bottom/lower region of the fluidized bed which enhances powder/particle dispersion.

Figure 2:
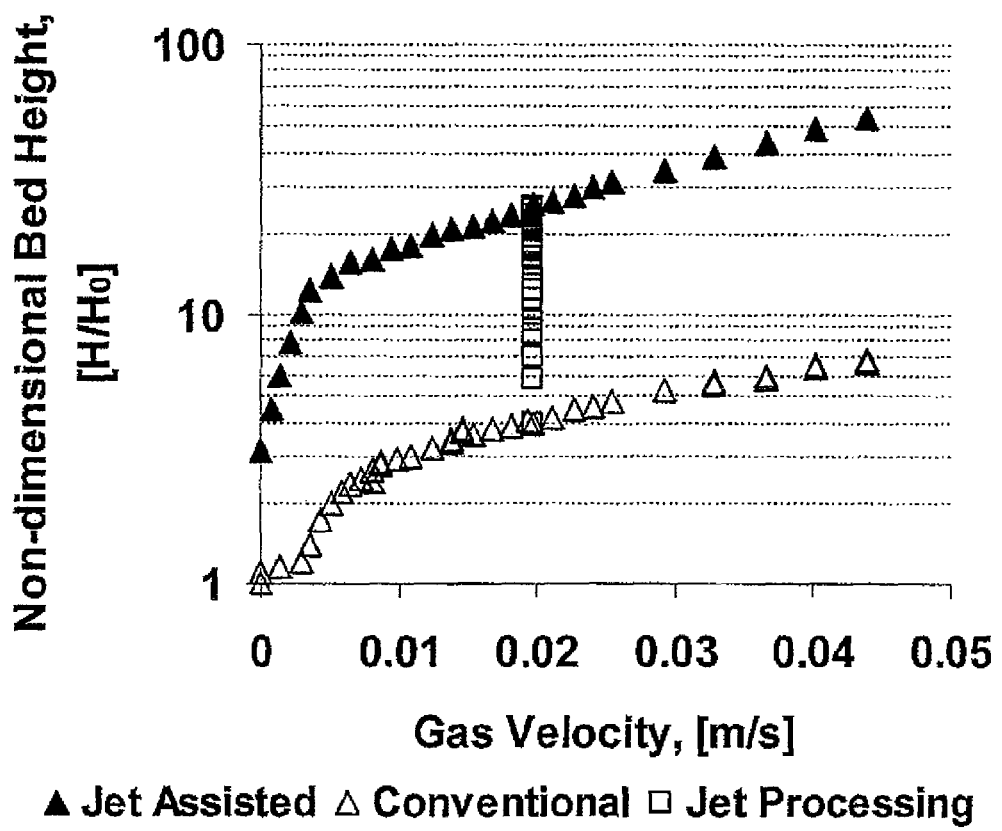

As a direct result of the downwardly directed micro jet assisting system and method disclosed herein, a much larger bed expansion is observed during fluidization of micro-jet processed nanopowders and nanoagglomerates. For example, FIG. 2 sets forth a plot of non-dimensional bed expansion for Aerosil® R974 silica (Degussa AG) relative to gas velocity. Aerosil® R974 is an hydrophobic silica nanopowder which shows agglomerate particulate fluidization (APF) behavior and is relatively easy to fluidize without assistance. For purposes of the data set forth in FIG. 2, the silica powder was first conventionally fluidized and the bed expansion was recorded. Bed expansion is an indication or measure of the dispersion of the powder within the fluidized bed.

Thereafter, the Aerosil® R974 powder was fluidized with a fraction of the fluidizing gas (nitrogen) fed through a reverse/downwardly directed micro jet. Processing of the powder with the downwardly directed micro jet was continued for about 1 hour (as shown in FIG. 7). After this fluidization period, the flow of gas was stopped and the bed was allowed to settle. After measuring the new initial bed height, which was about double the original bed height, the bed of powder was conventionally fluidized. It can be seen in FIG. 2 that the non-dimensional bed expansion (about 30 times, with respect to the initial bed height, at 3 cm/s) is significantly greater than that that obtained with the untreated powder (about 5 times, with respect to the initial bed height, at 3 cm/s). These results demonstrate that the silica powder was better dispersed in the gas phase as a result of, and after treatment with, the downwardly directed micro jet flow.

Figure 3:
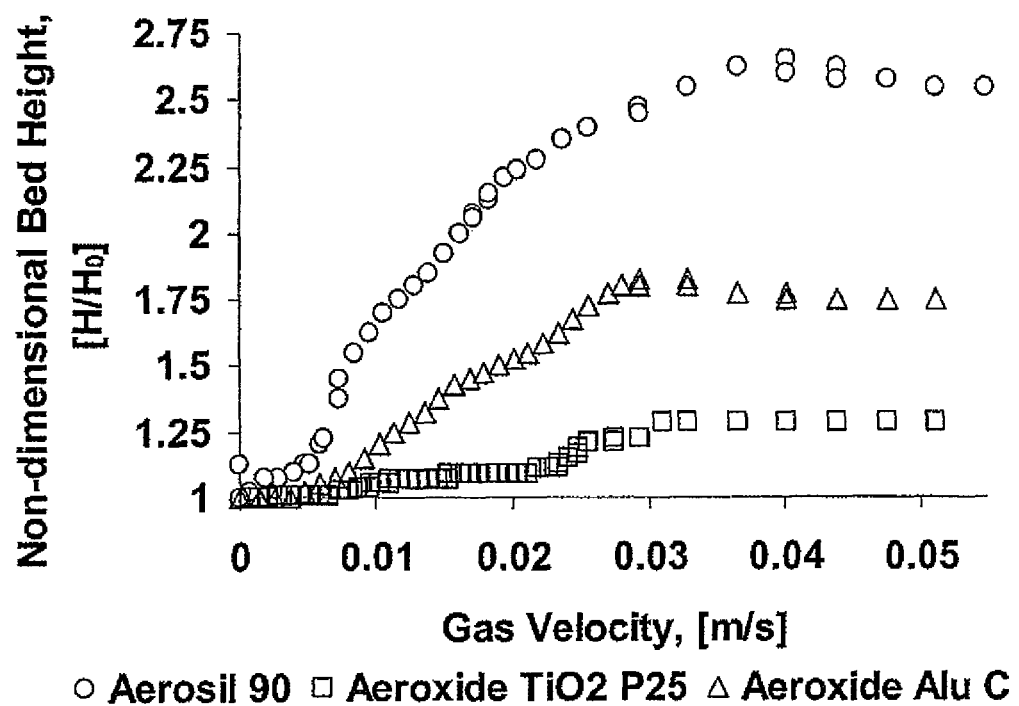
FIG. 3 is a plot of the non-dimensional bed expansion (actual bed height divided by the initial bed height at zero flow) as a function of gas velocity for conventionally fluidized beds of ABF type nanopowders: Aerosil® 90 silica, Aeroxide® $TiO_2$ P25 and Aeroxide® Alu C alumina.

As noted previously, powders exhibiting agglomerate bubbling fluidization (ABF) behavior are very difficult to fluidize except at high velocities. Moreover, high velocity fluidization flow generally results in bubbling, gas bypass and elutriation of particles. According to the present disclosure, when a bed of nanopowders that otherwise exhibits agglomerate bubbling fluidization (ABF) behavior was processed in a fluidization system that includes one or more downwardly directed micro-jets, dramatically enhanced fluidization quality is observed. Dispersion of the powder in the gas phase was measured by bed expansion. FIG. 3 shows bed expansion for different runs of conventionally fluidized beds of Aerosil® 90 silica powder, Aeroxide® $TiO_2$ P25 and Aeroxide® Alu C, all of which exhibit ABF behavior. As can be seen, the bed expansion under control conditions is quite limited and about 2.5 times the initial bed height in the best case.

Figure 4:
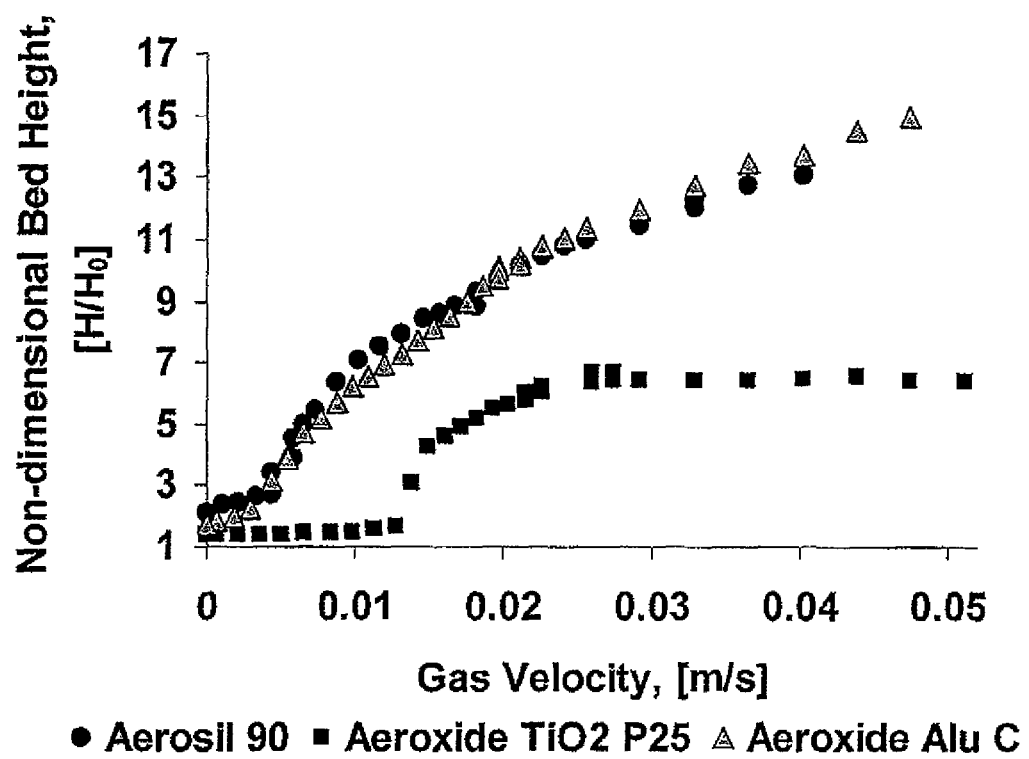
FIG. 4 is a plot of the non-dimensional bed expansion as a function of gas velocity for the micro jet assisted fluidization of the same powders shown in FIG. 3.

FIG. 4 shows the bed expansion of the same amounts of powders shown in FIG. 3, but during fluidization with reversed micro jet assistance. It can be seen that downwardly directed micro-jet processing enhances dispersion of the powder in the gas phase by producing bed expansions several times the initial bed height. Of note, operation of downwardly directed micro jets with ABF nanopowder systems is believed to advantageously convert such ABF type powder to APF behavior. This conversion is believed to be maintained by the powder system, thereby translating to enhanced fluidization behavior for ABF type powders that is wholly unexpected and highly advantageous.

From the information presented in TABLE 1, it can be seen that the bulk density of the powder and therefore, in all probability, the density of the agglomerates of nanoparticles, has been reduced. A bulk density reduction reflects, inter alia, better aeration of the powder system when downwardly directed micro jet processing is employed. The bulk density values given in TABLE 1 have been calculated as a function of the bed height. The maximum bed height is given at the maximum gas velocity before bubbling fluidization occurs.

The numbers in parentheses in the row labeled "Max bed height" are calculated as $H/H_o$, and the numbers in parentheses in the row labeled "Final $p_b$ (bulk density)" correspond to the percent increase (or decrease) in the observed bulk density.

Surprisingly, the bulk density of Aerosil® 90 silica has been reduced by over 50% through the downwardly directed micro-jet processing system of the present disclosure as compared to the bulk density of fresh powder. In addition and as reflected in TABLE 1, micro-jet processing as disclosed herein advantageously suppresses and/or eliminates bubbling. The large bed expansion reported in TABLE 1 demonstrates that the micro jet processed powder has been advantageously converted from ABF to APF type behavior.

Thus, as shown in FIGS. 2-4, bed expansion during fluidization of APF and ABF type nanopowders has been measured with and without gas flow through a reversed micro-jet. As shown in the foregoing figures, bed expansion in a micro-jet assisted fluidized bed is several times the initial bed height. In addition, a higher fluidized bed pressure drop (in a fluidized bed operating above the minimum fluidization velocity, the pressure drop is equal to the amount (weight) of fluidized powder per unit cross sectional area of the bed) is obtained when comparing the micro jet assisted method of the present disclosure relative to conventional fluidization of similar amounts of nanopowder by weight. These results demonstrate that more powder is being suspended by the flow of gas during the micro jet assisted fluidization, another indication of the overall better dispersion of the powder in the fluidized bed.

In connection with the experimental results discussed herein, various nozzles were evaluated. Based on the experimental runs reported herein, it was generally determined that the downwardly directed micro-jet nozzles yielded similar bed expansion performance. The pressure upstream of the micro-jet nozzle was generally maintained at 120 psi for all nozzles (with one exception). Due to the high velocity given by the noted upstream pressure exception, electrostatic charge built up causing the collapse of the bed. To gather data for this particular micro jet nozzle, the exit velocity was reduced by lowering the pressure. In the other micro jet nozzle systems, bed collapse occurred only after a prolonged processing run.

Additional test results according to the present disclosure are set forth in FIGS. 6-13. These test results and associated test conditions are described herein below.

The test results of FIGS. 6-7 relate to fluidization of Aerosil® R974 silica. FIG. 6 reflects pressure drop performance and FIG. 7 reflects the evolution of the non-dimension bed height with respect to time under constant fluidizing gas flow

TABLE 1

Fluidization characteristics of fluidized beds of Aerosil ® 90 silica

| | Case # | | | | |
|---|---|---|---|---|---|
| | 1 | 2 | 3 | 4 | 5 |
| Fluidization | Conv. | Conv. | Assisted | Conv. | Assisted |
| Powder condition | Fresh | Fresh | Fresh | After Jet (9) | After Jet (9) |
| Mass (g) | 68 | 68 | 68 | 66.5 | 66.5 |
| $H_0$ (cm) | 22 | 22 | 22 | 27 | 27 |
| $\rho_{b0}$ (kg/m$^3$) | 67 | 67 | 67 | 54 | 54 |
| Bubbling? | Strong | Strong | None | Slightly | None |
| Max bed height (cm) | 28.6 (1.3) | 27.2 (1.2) | 124.8 (5.7) | 145 (5.4) | 151 (5.6) |
| Final $\rho_b$ (kg/m$^3$) | 76.7 (13%) | 76.7 (13%) | 41 (−38%) | 26 (−51%) | 25 (−53%) | during micro jet processing of the powder. The processing time was dependent on the gas velocity. Better processing results were achieved when the bed voidage was larger, i.e., at higher gas velocity. For the reported test results, the fluidizing gas was nitrogen. The reverse micro jet nozzle had an inner diameter of 230 μm and the nozzle pressure was 120 psi. The Aerosil® silica powder was sieved to less than 500 μm. The tests demonstrated a large bed expansion and reduced bubbling with the disclosed reverse micro-jet operation.

The test results of FIG. 8 relate to fluidization of Aerosil® 90(from process) silica and reflect pressure drop performance. Based on the measured pressure drop with respect to the gas velocity, the minimum fluidization velocities can be found. It can be seen that the minimum fluidization velocity of Aerosil® 90 (from process) has been significantly reduced when using micro jet assistance as pointed by the vertical arrows. For the reported test results, the fluidizing gas was nitrogen. The reverse micro jet nozzle had an inner diameter of 230 μm and the nozzle pressure was 120 psi. The jet velocity was 530 m/s and the Aerosil® silica powder (21.2 grams of A90 from process) was sieved to less than 850 μm. The tests demonstrated a reduction in bulk density from 18 to 15 kg/m$^3$.

The test results of FIGS. 9-10 relate to micro jet assisted fluidization of Aerosil® 90 silica systems and provide comparative results for various nozzles sizes. In the reported tests, Aerosil® 90 silica powder (18 grams) was sieved to less than 850 μm. In all test runs, the gas velocity during micro jet processing of the powder was held constant at 1.6 cm/s. Based on the results set forth in FIG. 10, it is noted that as the nozzle size decreases, the processing of powders slows down because less flow is passing through the nozzle. Two of the tested 127 μm micro jet nozzles exhibited flow rates of 0.8 l/m, which is equivalent to the flow rates for the 178 μm micro jet nozzle. Also, two 127 μm micro-jet nozzles were operated at 75 psi and demonstrated slightly better performance than a corresponding 127 μm micro-jet nozzle operated at 120 psi.

The test results of FIGS. 11-12 relate to fluidization of Aerosil® 90 silica and provide comparative results for varying nozzle orientations with a nitrogen fluidizing gas. The Aerosil® 90 silica powder (18 grams) was sieved to less than 850 μm. Two micro-jet nozzles were utilized, both having an inner diameter of 127 μm. In these experiments, both reverse micro-jet flow (i.e., downwardly directed) and co-current micro jet flow through the two (2) micro-jet nozzles were tested. The nozzle pressure was 120 psi and the jet velocity was 527 m/s. As can be seen in FIGS. 11 and 12, enhanced fluidization performance (increased pressure drop, indicating full fluidization of all the powder and increased bed expansion) was obtained with downward directed micro-jets. The bulk density was reduced from 39 to 18 kg/m$^3$ after jet processing.

The fluidization of Aeroxide™ TiO$_2$ P25—which generally exhibits ABF behavior—is of special interest because it is one of the most difficult nanopowders to fluidize, and when fluidized at high gas velocity, bubbles vigorously. During conventional fluidization, the bed does not expand significantly, but in testing according to the present disclosure, micro-jet assistance dramatically improves fluidization performance. In particular, typical ABF type behavior of the Aeroxide™ TiO$_2$ P25 was transformed into a particulate fluidization, APF type behavior, with large bed expansion and no bubbles. Tests were conducted in a 5-inch diameter bench-scale column with an initial bed height of 5 inches at zero gas velocity. Fluidization with jet assistance was effective to achieve a bed height of about 25.5 inches. A smooth interface was observed that demonstrated transformation from ABF to APF type fluidization behavior, completely free of bubbles that usually disrupt the surface of the fluidized bed.

With reference to FIGS. 13-14, the effects of jet axial velocity are set forth in exemplary implementations of the disclosed fluidization system. For purposes of FIG. 13, the upstream pressure for both micro jet nozzles (127 μm and 508 μm) was 120 psi. With reference to FIG. 14, the upstream pressure for the 127 μm nozzle was 120 psi, whereas the upstream pressure for the 508 μm was 20 psi. The purpose of FIGS. 13-14 is to show the shear produced by the micro jet flow. Shear is defined as the rate at which velocity changes with respect to position. In these cases (FIG. 13-14), axial velocity is changing with respect to radial position. The faster rate at which the velocity changes with radial position is shown by the smaller nozzle; therefore, the smaller nozzle provides a higher shear rate which is useful for breaking the agglomerates. The velocity profiles are plotted as a function of the radial position at different distances from the tip of the nozzle (20, 50 and 200 mm).

Based on the foregoing test results, the following conclusions may be noted:

When processing Aerosil® R974, it was found that the processing rate depends on the total gas velocity (jet+primary flow). Gas velocities in the range of 2 to 4.5 cm/s are desirable when using downwardly directed micro-jets.

When comparing nozzle sizes, a smaller nozzle necessarily translates to a lower jet flow, hence, lower processing rate although higher shear rate. Acceptable micro-jet nozzle sizes include nozzles having diameters of between about 100 to 500 μm.

When flow through micro-jet nozzles of different sizes is made equivalent by using different numbers of micro jet nozzles, the smaller micro-jet nozzles perform better.

Larger nozzles generate larger jet flow at high velocities, generating electrostatic charges that hinder fluidization. Extremely high flows are not desirable.

Upward and downward micro-jet nozzles were tested. Overall, downwardly directed micro-jet nozzles performed better, but upwardly directed micro-jet nozzles also significantly improved fluidization. Indeed, downwardly directed micro jets successfully enhanced fluidization of fumed metal oxide nanoparticles. In the case of upwardly directed micro-jet nozzles, powder below the level of the nozzle remained that was not effectively processed.

From axial jet velocity profiles: 507 μm nozzles operated at 120 psi delivered extremely high velocities that generated electrostatic charge. Pressure had to be reduced down to 20 psi to allow fluidization without bed collapse due to build up of electrostatic charge.

FIGS. 15-17 are schematic diagrams related to exemplary fluidization systems for use according to the present disclosure, particularly in connection with potential scale-up from the experimental units utilized in the experimental work described above. With reference to FIGS. 15 and 17, a column inner diameter of 660 mm is contemplated with a plurality of micro-jet nozzles that each have a diameter of 250 μm. Such micro-jet nozzles would support a flow of about 1.5 l/m through each micro-jet and total flow through all micro-jet nozzles of approximately 135 l/m. This micro-jet nozzle flow would represent approximately 13% of the total gas flow into the column of about 1000 l/m or ~5 cm/s. Nozzle length is generally maintained as short as possible, e.g., a maximum nozzle length of about 5 cm. The disclosed column design includes a deflector that takes the form of a sieve tray. Various opening designs and geometries are contemplated. As shown in FIG. 17, multiple nozzle trays may be employed, if desired or necessary to achieve desired fluidization performance.

FIG. 16 schematically depicts an exemplary micro jet nozzle array for an exemplary multi-nozzle system. The micro jet nozzles are typically separated from each other by an appropriate distance, e.g., approximately 10 cm. The nozzle-tray system disclosed herein will generate turbulence and better mixing as well as providing the benefit of shear from the micro-jets. Powder will pass through the sieve tray towards the bottom for removal from the fluidized bed.

In sum, the present disclosure provides advantageous systems and methods for fluidizing nanopowder/nanoagglomerate powders. Among the advantages of the disclosed micro-jet assistance are much better dispersion of powder in the gas phase, as reported by the increase in void in the fluidized bed; the suppression of bubbling and spouting, and the destruction of large agglomerates. It is believed that mixing is also enhanced due to the increase in the dynamics of the bed. Furthermore, unlike other nanofluidization assisted methods, use of the disclosed reverse micro-jet(s) is simple to implement, does not need any special equipment or energy sources, and does not require the addition of any foreign material to the bed.

Although the present disclosure has been described with reference to exemplary embodiments and, implementations thereof, the present disclosure is not to be limited by or to such disclosed embodiments and/or implementations. Rather, the disclosed fluidization systems and methods have wide ranging applications to nanopowder/nanoparticle systems and other micron-sized powder systems (e.g., Geldart Class C powders), and are susceptible to many variations, modifications and/or enhancements without departing from the spirit or scope hereof. The present disclosure expressly encompasses all such variations, modifications and/or enhancements.

The invention claimed is:

1. A method for fluidizing nanoparticles, comprising:
   a. introducing nanoparticles having a particle size of less than about 100 nm into a fluidization chamber;
   b. delivering a fluidizing medium to the fluidization chamber, the fluidizing medium being directed in an upward direction relative to the fluidization chamber;
   c. delivering a substantially downwardly directed gas flow to the fluidization chamber, the gas flow being introduced to the fluidization chamber by at least one micro-jet nozzle;
   wherein the fluidizing medium and the substantially downwardly directed gas flow are effective to fluidize the nanoparticles to a predetermined fluidization level.

2. The method according to claim 1, wherein the fluidizing medium is introduced through a porous distributor.

3. The method according to claim 1, wherein the at least one micro jet nozzle has a diameter of between about 100 μm and 500 μm.

4. The method according to claim 1, wherein the gas flow through the at least one micro jet nozzle is subject to an upstream pressure of about 1 psi to about 500 psi.

5. The method according to claim 1, wherein between approximately 1 to 50% of gas flow to the fluidization chamber is directed to the at least one micro jet nozzle.

6. The method according to claim 1, wherein gas flow through the at least one micro-jet nozzle exits the at least one micro-jet nozzle at a velocity in the range from 100 m/s to about 5000 m/s and flow velocity of the fluidizing medium is up to 0.1 m/s.

7. The method according to claim 1, wherein the fluidizing medium and the substantially downwardly directed gas flow are effective to fluidize the nanoparticles to a predetermined fluidization level that is at least two times greater than a fluidization level achieved in the absence of the micro-jet nozzle gas flow.

8. The method according to claim 1, wherein the fluidizing medium and the substantially downwardly directed gas flow are effective to fluidize the nanoparticles to a predetermined fluidization level that is at least ten times greater than a fluidization level achieved in the absence of the micro-jet nozzle gas flow.

9. The method according to claim 1, further comprising discontinuing gas flow through the at least one micro jet nozzle after fluidization to the predetermined fluidization level is achieved.

10. A fluidization method, comprising:
    a. introducing nanoparticles into a fluidization chamber;
    b. delivering a fluidizing medium to the fluidization chamber, the fluidizing medium being directed in a first direction relative to the fluidization chamber;
    c. delivering a secondary gas flow to the fluidization chamber in a second direction, wherein the secondary gas flow is introduced to the fluidization chamber by at least one micro-jet nozzle;
    whereby the fluidizing medium and the secondary gas flow are effective to fluidize the nanoparticles to at least a predetermined fluidization level.

11. The method according to claim 10, wherein the fluidizing medium is introduced through a porous distributor.

12. The method according to claim 10, wherein the at least one micro-jet nozzle has a diameter of between about 100 μm and 500 μm.

13. The method according to claim 10, wherein the secondary gas flow through the at least one micro jet nozzle is subject to an upstream pressure of about 1 psi to about 500 psi.

14. The method according to claim 10, wherein between approximately 1 to 50% of gas flow to the fluidization chamber is directed to the at least one micro jet nozzle.

15. The method according to claim 10, wherein secondary gas flow through the at least one micro jet nozzle exits the at least one micro-jet nozzle at a velocity in the range from 100 m/s to about 5000 m/s and flow velocity of the fluidizing medium is up to 0.1 m/s.

16. The method according to claim 10, wherein the fluidizing medium and the secondary gas flow are effective to fluidize the nanoparticles to a predetermined fluidization level that is at least two times greater than a fluidization level achieved in the absence of the micro jet nozzle gas flow.

17. The method according to claim 10, wherein the fluidizing medium and the secondary gas flow are effective to fluidize the nanoparticles to a predetermined fluidization level that is at least ten times greater than a fluidization level achieved in the absence of the micro jet nozzle gas flow.

18. The method according to claim 10, further comprising discontinuing gas flow through the at least one micro-jet nozzle after fluidization to the predetermined fluidization level is achieved.

19. The method according to claim 10, wherein the second direction is a substantially co-current direction relative to the first direction.

20. The method according to claim 10, wherein the second direction is substantially oppositely directed relative to the first direction.

* * * * *